(12) United States Patent
Ichikawa (10) Patent No.: US 8,561,737 B2
(45) Date of Patent: Oct. 22, 2013

(54) CHARGING CABLE-HOUSING DEVICE AND VEHICLE

(75) Inventor: Shinji Ichikawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 352 days.

(21) Appl. No.: 12/968,668

(22) Filed: Dec. 15, 2010

(65) Prior Publication Data

US 2011/0139521 A1 Jun. 16, 2011

(30) Foreign Application Priority Data

Dec. 15, 2009 (JP) ................................. 2009-283971

(51) Int. Cl.
*B65H 7/00* (2006.01)

(52) U.S. Cl.
USPC .......................... 180/65.21; 242/390; 242/397

(58) Field of Classification Search
USPC .......... 180/65.21, 65.1, 69.4; 242/564.3, 390, 242/397, 387, 403, 593, 548, 566, 615, 242/615.1, 140, 157 R
See application file for complete search history.

(56) References Cited

U.S. PATENT DOCUMENTS

| | | | | |
|---|---|---|---|---|
| 2,808,892 A * | 10/1957 | Walker | ........................... | 180/69.4 |
| 3,753,342 A * | 8/1973 | Yoshitake et al. | ................. | 57/71 |
| 3,868,069 A * | 2/1975 | Schulz | ............................ | 242/128 |
| 4,890,957 A * | 1/1990 | Rinas | ............................... | 405/174 |
| 5,485,972 A * | 1/1996 | Mummery et al. | ............ | 242/386 |
| 5,803,216 A * | 9/1998 | McNaught | .................... | 191/12.4 |
| 5,855,262 A * | 1/1999 | Jackson | ........................ | 191/12.4 |
| 5,887,815 A * | 3/1999 | Pierce | ............................ | 242/386 |
| 6,264,016 B1 * | 7/2001 | Bales | .............................. | 191/12.4 |
| 6,854,575 B1 * | 2/2005 | Desormeaux et al. | ........ | 191/12.4 |
| 6,988,854 B2 * | 1/2006 | Porter | ............................ | 405/165 |
| 2008/0308328 A1 * | 12/2008 | Kejha | ............................ | 180/65.2 |
| 2011/0061981 A1 * | 3/2011 | Ori et al. | ................... | 191/12.2 R |
| 2011/0193521 A1 * | 8/2011 | Ichikawa | ....................... | 320/109 |
| 2011/0234159 A1 * | 9/2011 | Ohtomo et al. | ................ | 320/109 |
| 2012/0228420 A1 * | 9/2012 | Ichikawa | ....................... | 242/398 |
| 2012/0262115 A1 * | 10/2012 | Ichikawa et al. | ............... | 320/109 |

FOREIGN PATENT DOCUMENTS

| | | | |
|---|---|---|---|
| JP | 05083838 | A | 4/1993 |
| JP | 05084055 | U | 11/1993 |
| JP | 10014014 | A | 1/1998 |
| JP | 2000037026 | A | 2/2000 |
| JP | 2000255248 | A | 9/2000 |
| JP | 2002226143 | A | 8/2002 |
| JP | 2003244832 | A | 8/2003 |
| JP | 2006026008 | A | 2/2006 |
| JP | 2009112076 | A | 5/2009 |
| JP | 2009136108 | A | 6/2009 |

OTHER PUBLICATIONS

Japanese Office Action issued Dec. 6, 2011 from JP 2009-283971 with partial English translation.

* cited by examiner

*Primary Examiner* — Katy M Ebner
*Assistant Examiner* — Emma K Frick
(74) *Attorney, Agent, or Firm* — Gifford, Krass, Sprinkle, Anderson & Citkowski, P.C.

(57) ABSTRACT

A charging cable-housing device includes: a charging cable that supplies electric power from an external electric power source to a vehicle; a bobbin which is rotatable, and on which the charging cable is wound, and which is disposed in a rear portion of the vehicle; a casing that houses the bobbin, and that has an extraction opening through which the charging cable is extracted out; and a guide member that guides the charging cable led out from the bobbin from above the extraction opening toward the extraction opening.

11 Claims, 8 Drawing Sheets

CHARGING CABLE-HOUSING DEVICE AND VEHICLE

CROSS-REFERENCE TO RELATED APPLICATIONS

This application claims priority to Japanese Patent Application No. 2009-283971 filed on Dec. 15, 2009, which is incorporated herein by reference in its entirety including the specification, drawings and abstract.

BACKGROUND OF THE INVENTION

1. Field of the Invention

The invention relates to a charging cable-housing device and a vehicle.

2. Description of the Related Art

Various technical ideas regarding charging plugs have been proposed. For example, a charging plug structure described in Japanese Patent Application Publication No. 2009-112076 (JP-A-2009-112076) includes: a charging plug to detachably connect a connecting plug of an external electric power source; a grommet to hold the charging plug onto a vehicle body; and a charging wire harness to electrically connect the charging plug and a vehicle-mounted battery.

In the foregoing charging plug structure, the charging wire harness is constructed so as to maintain the electrical connection between the battery and the charging plug even when the charging plug is detached from the grommet and is moved apart from the vehicle; on the other hand, when the charging plug is held by the grommet, the charging wire harness is wound on a winding reel of an electric cord reel unit.

Besides, in an electric vehicle described in Japanese Patent Application Publication No. 2003-244832 (JP-A-2003-244832), a battery is charged through the use of a winding-type charging cord. The charging cord is attached to a drum.

In the charging plug structure described in JP-A-2009-112076, the charging wire harness is led out from a portion below the winding reel, and is connected to the charging plug.

When the charging plug is moved apart from the vehicle, the charging wire harness is pulled out from the winding reel.

In this case, the charging wire harness is likely to curve near the winding reel due to its own weight, and that may cause degradation of the charging wire harness.

The charging cord described in JP-A-2003-244832 is wound on the drum so that the charging cord is extracted out from a lower portion of the drum.

Therefore, when the charging cord is pulled out, the charging cord will curve near the drum, and that may cause degradation of the charging cord.

SUMMARY OF THE INVENTION

The invention provides a charging cable-housing device and a vehicle that restrain degradation of the charging cable.

A first aspect of the invention is a charging cable-housing device including: a charging cable that supplies electric power from an external electric power source to a vehicle; a bobbin which is rotatable, and on which the charging cable is wound, and which is disposed in a rear portion of the vehicle; a casing that houses the bobbin, and that has an extraction opening through which the charging cable is extracted out; and a guide member that guides the charging cable led out from the bobbin from above the extraction opening toward the extraction opening.

A second aspect of the invention is a vehicle including: an electricity storage that is rechargeable; a reservoir portion in which energy is kept in a form that is different from electric power; a vehicle main body that houses the electricity storage and the reservoir portion, and that includes a first side surface and a second side surface that is located at a side opposite the first side surface; and a charging cable-housing device that is provided in a rear portion of the vehicle main body, and that is connected to the electricity storage, wherein the charging cable-housing device includes: a charging cable that supplies electric power from an external electric power source to the electricity storage; a bobbin which is rotatable, and on which the charging cable is wound, and which is disposed in a rear portion of the vehicle main body; and a guide member that guides the charging cable led out from the bobbin, toward a location that is below a location where the charging cable is led out from the bobbin.

The charging cable-housing device in accordance with the first aspect of the invention and the vehicle in accordance with the second aspect of the invention are able to restrain degradation of the charging cable.

BRIEF DESCRIPTION OF THE DRAWINGS

The features, advantages, and technical and industrial significance of this invention will be described below with reference to the accompanying drawings, in which like numerals denote like elements, and wherein.

DETAILED DESCRIPTION OF EMBODIMENTS

Vehicles and charging cable-housing devices in accordance with embodiments of the invention will be described with reference to FIGS. 1 to 10.

Incidentally, while numbers, quantities, etc. are mentioned in conjunction with the following embodiments, those numbers, quantities, etc., do not limit the scope of the invention unless otherwise stated. Besides, in conjunction with the following embodiments, various component elements are described, but are not necessarily indispensable for the invention unless otherwise stated.

Figure 1:
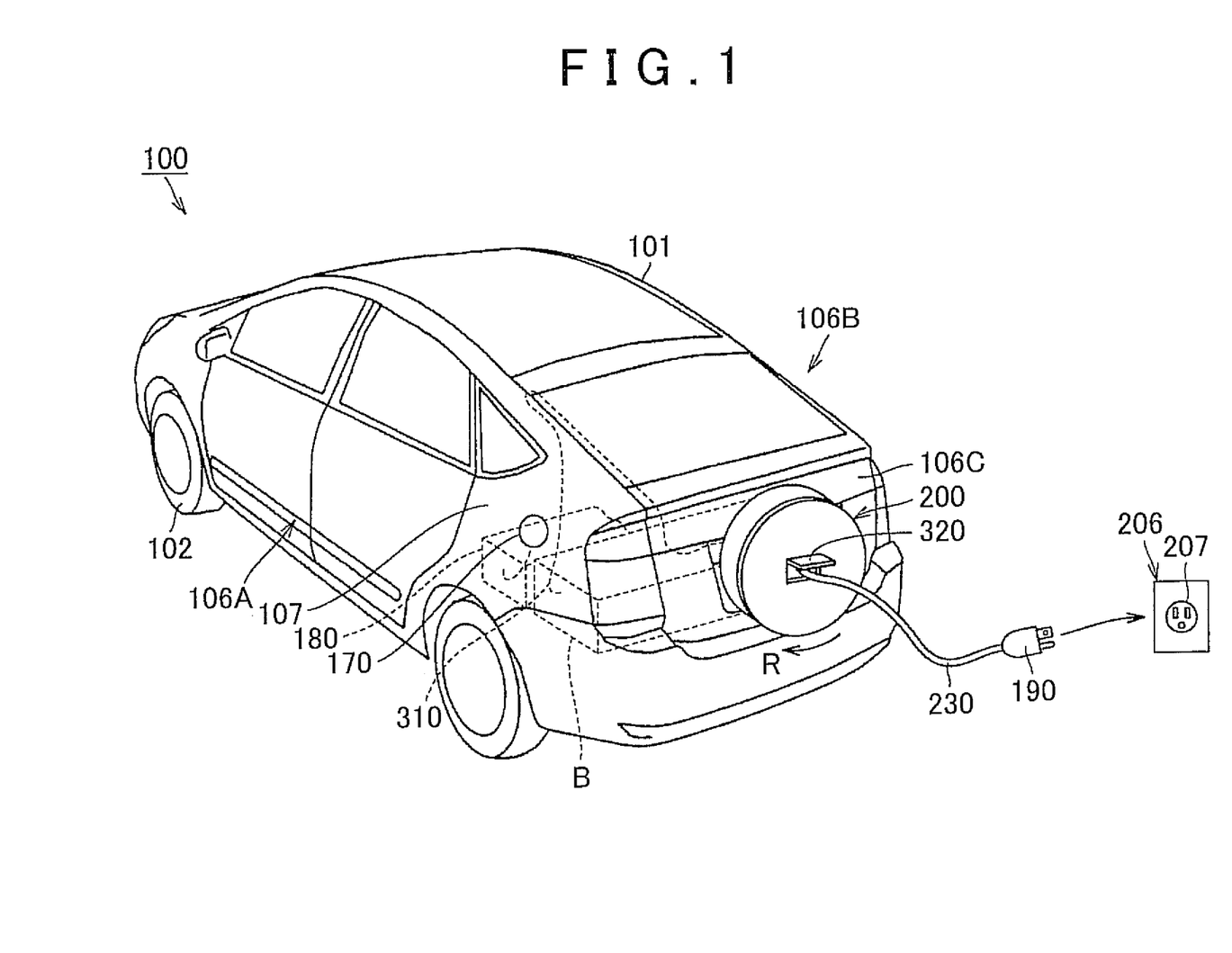
FIG. 1 is a perspective view of a vehicle in accordance with Embodiment 1 of the invention.
Figure 2:
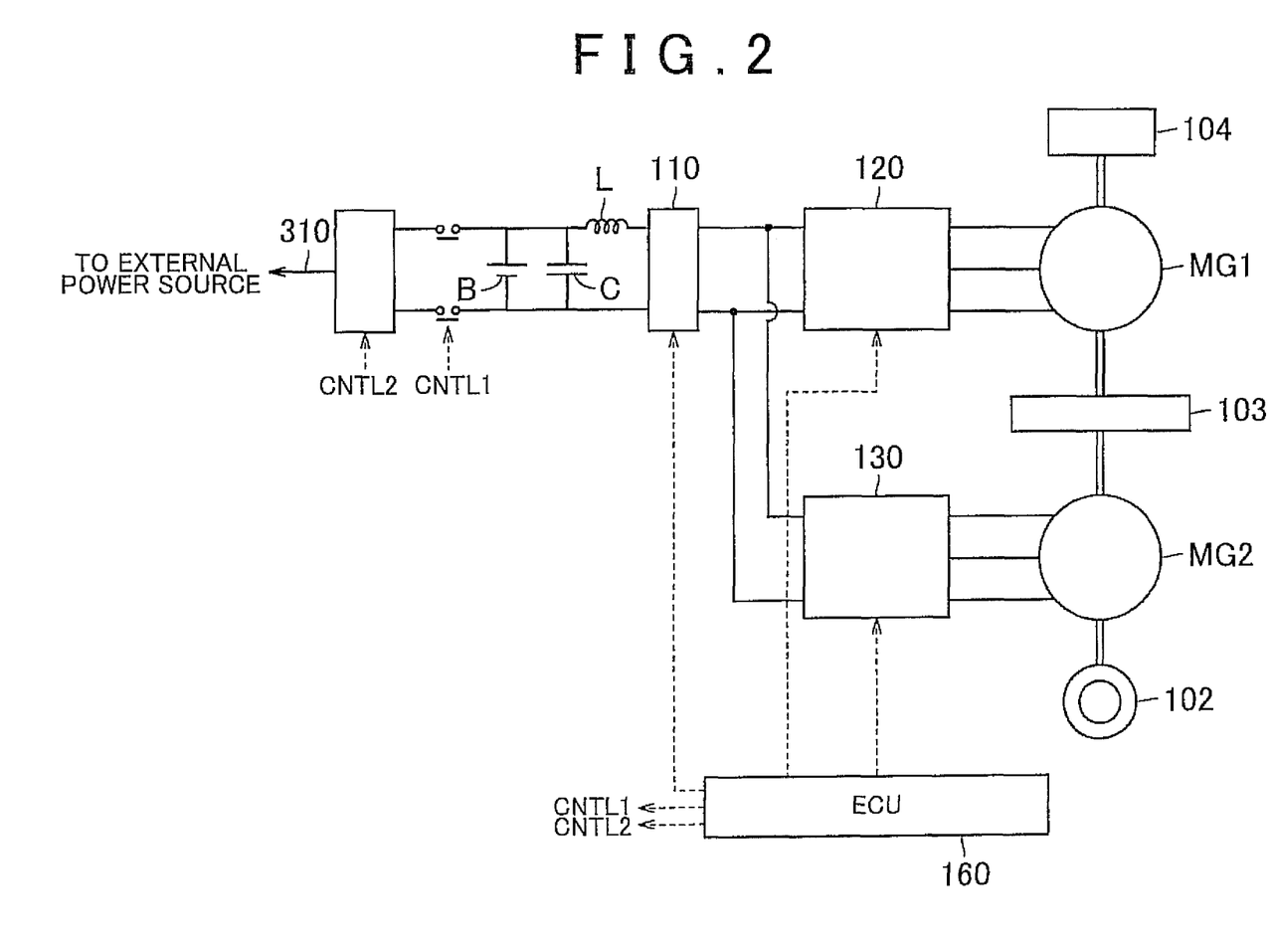
FIG. 2 is a block diagram showing a general construction of the vehicle shown in FIG. 1.

FIG. 1 is a perspective view of a vehicle 100 in accordance with Embodiment 1 of the invention. FIG. 2 is a block diagram showing a general construction of the vehicle 100 shown in FIG. 1.

The vehicle 100 is a hybrid vehicle that uses a motor and an internal combustion engine to drive wheels of the vehicle.

The vehicle 100 is equipped with an engine 104, motor-generators MG1 and MG2, a power splitting mechanism 103, a battery B, a capacitor C, an electric reactor L, a converter 110, inverters 120 and 130, and a vehicle electronic control unit (ECU) 160.

The power splitting mechanism 103 is coupled to the engine 104 and the motor-generators MG1 and MG2, and distributes motive power among them. The power splitting mechanism that is employed in the vehicle 100 may be, for example, a planetary gear mechanism that has three rotary shafts of a sun gear, a planetary carrier and a ring gear. The three rotary shafts are connected to rotary shafts of the engine 104 and of the motor-generators MG1 and MG2. For example, the engine 104 and the motor-generators MG1 and MG2 can be mechanically connected to the power splitting mechanism 103 by arranging a construction in which the rotor of the motor-generator MG1 has a hollow and the crankshaft of the engine 104 extends through the hollow portion of the rotor of the motor-generator MG1.

Besides, the rotary shaft of the motor-generator MG2 is coupled to a wheel 102 by a speed reduction gear and a differential gear (that are not shown). Furthermore, a speed reducer for the rotary shaft of the motor-generator MG2 may also be incorporated within the power splitting mechanism 103.

The motor-generator MG1 is incorporated in the hybrid motor vehicle as both a generator that is driven by the engine and an electric motor capable of starting the engine. The motor-generator MG2 is incorporated in the hybrid motor vehicle as an electric motor that drives the driving wheels of the hybrid motor vehicle.

The motor-generators MG1 and MG2 are, for example, three-phase synchronous electric motors. Each of the motor-generators MG1 and MG2 includes, as stator coils, three-phase coils made up of U-phase coils, V-phase coils and W-phase coils.

The motor-generator MG1 generates three-phase alternating-current voltage through the use of engine output, and outputs the generated three-phase alternating-current voltage to the inverter 120. Besides, the motor-generator MG1 generates drive force from the three-phase alternating-current voltage input from the inverter 120, so as to start the engine 104.

The motor-generator MG2 generates driving torque for the vehicle from the three-phase alternating-current voltage input from the inverter 130. Besides, during the regenerative braking of the vehicle, the motor-generator MG2 generates three-phase alternating-current voltage, and outputs it to the inverter 130.

The battery B used in the vehicle 100 may be, for example, a secondary battery such as a nickel hydride battery, a lithium-ion battery, a lead storage battery, etc. Besides, the battery B may also be replaced with an electric double layer capacitor that has a large capacity.

The vehicle 100 is equipped with the charging cable-housing device 200 that supplies electric power from an external electric power source 206 to the battery B. The charging cable-housing device 200 is provided in a rear portion of the vehicle 100.

Figure 3:
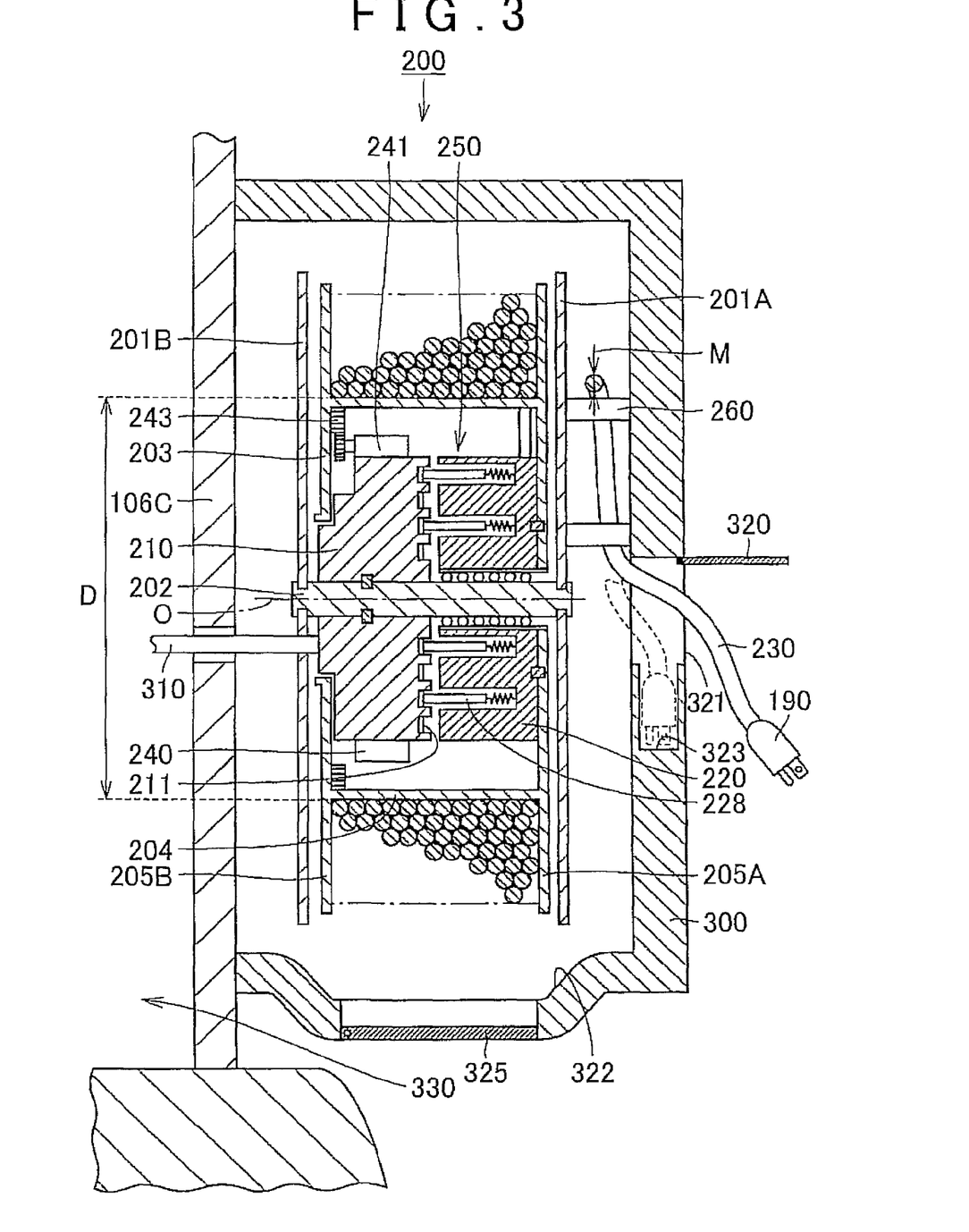
FIG. 3 is a sectional view of a charging cable-housing device.

FIG. 3 is a sectional view of the charging cable-housing device 200. As shown in FIG. 3, the charging cable-housing device 200 includes the charging cable 230 that supplies electric power from the external electric power source 206 to the battery B, and a bobbin 203 which is provided so as to be rotatable, and on which the charging cable 230 is wound, and which is disposed in a rear portion of the vehicle 100. The charging cable-housing device 200 also includes an extraction opening 321 through which the charging cable 230 led out from the bobbin 203 is extracted out, and a guide member 260 that guides the charging cable 230 to the extraction opening 321 from a location that is above the extraction opening 321.

A distal end of the charging cable 230 is provided with a plug 190 that is to be connected to a plug receptacle 207 of the external electric power source 206 shown in FIG. 1. By connecting the plug 190 to the plug receptacle 207, electric power is supplied to the battery B of the vehicle 100.

In order to connect the plug 190 to the plug receptacle 207, an operator pulls out the plug 190 from the charging cable-housing device 200. As the plug 190 is pulled out, the bobbin 203 rotates to continually feed out the charging cable 230.

Since the charging cable 230 is guided from above the extraction opening 321 down to the extraction opening 321 by the guide member 260, the curvature of the charging cable 230 due to its own weight is unlikely to occur near the extraction opening 321. Therefore, degradation of the charging cable 230 is restrained.

The charging cable-housing device 200 also includes a case 300 that covers the bobbin 203 and the like. The extraction opening 321 is formed in the case 300.

The charging cable-housing device 200 also includes a shaft portion 202 that rotatably supports the bobbin 203. Therefore, the bobbin 203 is provided so as to be rotatable about a rotation center line O. The extraction opening 321 of the case 300 is formed at a position on the rotation center line O (i.e., a position that corresponds to the shaft portion 202).

Incidentally, a casing that houses the bobbin 203 and the like is formed by the case 300 and a back door 106C. In the construction shown in FIG. 3, the case 300 is disposed on an outside surface of the back door 106C, and the extraction opening 321 formed in the case 300 is disposed so that the opening faces in the rearward direction of the vehicle 100.

The charging cable-housing device 200 also includes a side wall portion 201A that is fixed to an end portion of the shaft portion 202, and a side wall portion 201B that is fixed to another end portion of the shaft portion 202 and that is spaced from the side wall portion 201A. The bobbin 203 is disposed between the side wall portion 201A and the side wall portion 201B. The side wall portion 201A is disposed nearer to the extraction opening 321 than the bobbin 203 is. The bobbin 203 includes a cylindrical portion 204 that is formed in a hollow cylindrical shape, a support plate 205A that is formed on an end portion of the cylindrical portion 204, and a support plate 205B that is formed on another end portion of the cylindrical portion 204.

The charging cable-housing device 200 further includes a motor 241 that rotates the bobbin 203. As the motor 241 operates, the bobbin 203 is rotated to wind the charging cable 230 that has been pulled out.

In the example construction shown in FIG. 3, the motor 241 has a rotary shaft, and a gear that is provided on a distal end portion of the rotary shaft. An annular gear 243 is formed in an inner peripheral surface of the cylindrical portion 204.

The annular gear 243 is in mesh with the gear of the motor 241. As the motor 241 is driven, the gear provided on the rotary shaft is rotated, so that the cylindrical portion 204 rotates.

The motor 241 is provided in a housing chamber 250 that is formed within the cylindrical portion 204. In this manner, size increase of the charging cable-housing device 200 is restrained.

In the housing chamber 250, there are disposed a stator 210 that is fixed to the shaft portion 202, and a rotor 220 that is provided so as to be rotatable about the shaft portion 202 and that is fixed to the support plate 205A of the bobbin 203. The motor 241 is fixed to the stator 210.

The stator 210 and the rotor 220 are spaced from each other. Of the surfaces of the stator 210, a main surface facing the rotor 220 is provided with a plurality of contact pieces 211.

The contact pieces 211 are formed of an electrically conductive metal material, or the like. In the example construction shown in FIG. 3, there are provided four annular contact pieces 211 that are substantially circular about the rotation center line O.

A portion of the rotor 220 which faces the contact pieces 211 is provided with a plurality of contact pins 228 that contact the contact pieces 211. The contact pins 228 are individually urged toward the contact pieces 211 so that distal end portions of the contact pins 228 are in contact with the contact pieces 211. The contact pins 228 are formed of an electrically conductive metal material or the like.

Thus, the contact between the contact pins 228 and the contact pieces 211 is maintained even when the plug 190 is pulled out rotating the bobbin 203 and the rotor 220 together.

Incidentally, the outermost positioned contact piece 211 is connected to a signal line. This signal line is connected to, for example, the vehicle ECU 160 shown in FIG. 2.

The contact pin 228 that contacts the contact piece 211 connected to the signal line is also connected to a signal line that is provided within the charging cable 230. When the plug 190 is connected to an external electric power source at a station, signals are exchanged between the station and the vehicle ECU 160.

The contact piece 211 positioned next to the contact piece 211 connected to the signal line is connected to a ground wire. Likewise, the contact pin 228 that contacts the contact piece 211 connected to the ground wire is connected to a ground wire that is provided within the charging cable 230.

The other two contact pieces 211 are disposed inwardly of the contact piece 211 that is connected to the ground wire. These contact pieces 211 are each connected to an electric power line, and also connected to the battery B.

The contact pins 228 that contact the contact pieces 211 that are electrically connected to the battery B are connected to electric power lines that are provided in the charging cable 230.

Thus, since the contact pieces 211 and the contact pins 228 connected to the electric power lines are disposed most inwardly of the four sets of contact pieces 211 and contact pins 228, abrasion of the contact pieces 211 and the contact pins 228 connected to the power lines is restrained.

The charging cable-housing device 200 further includes an electric leak prevention device 240 that is provided within the housing chamber 250. The electric leak prevention device 240 is fixed to the stator 210. A power supply harness 310 is connected to the stator 210. The power supply harness 310 and the foregoing contact pieces 211 are electrically interconnected via the electric leak prevention device 240.

Thus, the electric leak prevention device 240 is also housed in the housing chamber 250, so that size increase of the charging cable-housing device 200 is restrained.

The charging cable 230 is wound around the outer peripheral surface of the cylindrical portion 204. The charging cable 230 wound around the outer peripheral surface of the cylindrical portion 204 is supported by the support plate 205A and the support plate 205B.

The outside diameter D of the cylindrical portion 204 is greater than or equal to 15 times the diameter M of the charging cable 230, and is less than or equal to 30 times the diameter M. Since the cylindrical portion 204 having such a large diameter is used to wind up the charging cable 230, degradation of the charging cable 230 is restrained.

If the outside diameter D of the cylindrical portion 204 is smaller than 15 times the diameter M of the charging cable 230, the radius of curvature of the charging cable 230 becomes unfavorably small, and it may become difficult to restrain degradation of the charging cable 230. If the outside diameter D is larger than 30 times the diameter M, the volume of the bobbin 203 becomes unfavorably large, and it may become difficult to install in the vehicle 100.

Furthermore, the extraction opening 321 is provided in the case 300 at a position on the rotation center line O. The case 300 is provided with a lid 320 that opens and closes the extraction opening 321.

The side wall portion 201A formed in a plate has two main surfaces that face in the directions of the rotation center line O. The guide member 260 is formed on one of the two main surfaces of the side wall portion 201A which faces the extraction opening 321.

Figure 4:
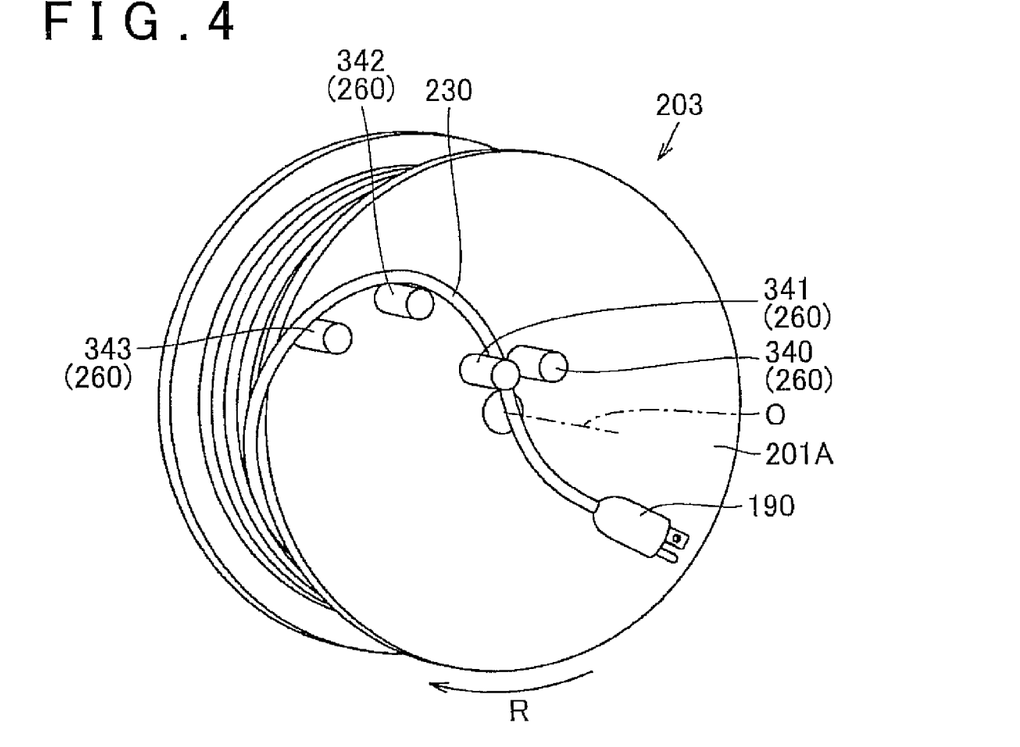
FIG. 4 is a perspective view of a bobbin and a side wall portion.
Figure 5:
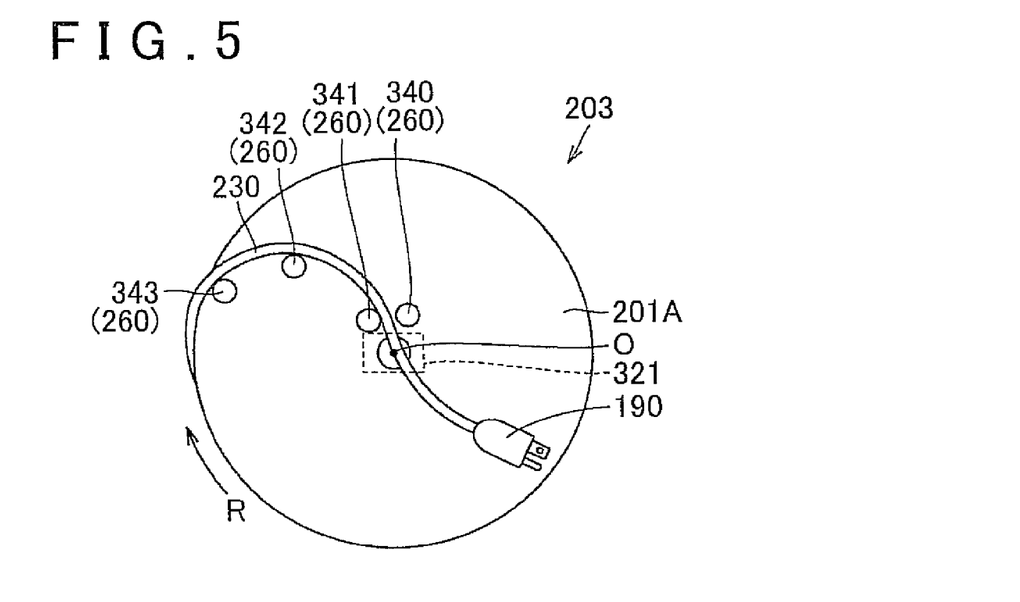
FIG. 5 is an elevation view of the bobbin and the side wall portion.

FIG. 4 is a perspective view of the bobbin 203 and the side wall portion 201A, and FIG. 5 is an elevation view of the bobbin 203 and the side wall portion 201A. As shown in FIGS. 4 and 5, the guide member 260 includes: a lead-out portion 343 that leads the charging cable 230 wound on the cylindrical portion 204 out onto the main surface of the side wall portion 201A; a first guide portion 342 that guides the charging cable 230 led out by the lead-out portion 343 to a location above the extraction opening 321 shown in FIG. 2; and second guide portions 340 and 341 that guide the charging cable 230 guided by the first guide portion 342 further to the extraction opening 321 shown in FIG. 2.

The charging cable 230 led out by the lead-out portion 343 is guided upward by the first guide portion 342, and then extends downward, and passes between the second guide portion 340 and the second guide portion 341, by which the charging cable 230 is guided to the extraction opening 321. Since the charging cable 230 is guided from above the extraction opening 321 down to the extraction opening 321, the curvature of the charging cable 230 due to its own weight is restrained near the extraction opening 321.

The lead-out portion 343 and the first and second guide portions 340 to 342 are disposed on the main surface of the side wall portion 201A that faces the extraction opening 321. Therefore, if the charging cable-housing device 200 is disposed so that the extraction opening 321 faces in the rearward direction of the vehicle 100, the rotation center line O extends in the longitudinal direction of the vehicle 100.

The thickness of the charging cable-housing device 200 in the direction of the rotation center line O is less than the length of the charging cable-housing device 200 in its transverse direction. Therefore, by disposing the bobbin 203 so that the rotation center line O of the bobbin 203 extends in the longitudinal direction of the vehicle 100, it is possible to restrain the bobbin 203 from greatly protruding from the back door 106C.

Incidentally, although the guide member 260 shown above in conjunction with Embodiment 1 is constructed of a plurality of pins protruded from the main surface of the side wall portion 201A, the construction of the guide member 260 is not limited so.

For example, the guide member 260 may be constructed of a curved plate that is curved upward from the lead-out location at which the charging cable 230 is led out from the bobbin 203, and that extends in a curve toward the extraction opening 321.

The charging cable 230 drawn out from the bobbin 203 is curved by the guide member 260, and is guided thereby to the extraction opening 321.

Therefore, a portion of the charging cable 230 that is guided by the guide member 260 has a radius of curvature that is smaller than the radius of curvature of a portion of the charging cable 230 that is wounded on the bobbin 203.

The outside diameter D of the cylindrical portion 204 of the bobbin 203 is greater than or equal to 15 times and less than or equal to 30 times as large as the diameter M of the charging cable 230, as described above.

As shown in FIG. 3 and the like, the diameter of the side wall portion 201A formed in a circular plate is larger than the outside diameter D of the cylindrical portion 204. Therefore, a certain distance from an outer peripheral edge portion of the side wall portion 201A to the extraction opening 321 is ensured, so that the radius of curvature of a portion of the charging cable 230 that is guided by the guide member 260 is restrained from becoming excessively small. Due to this, degradation of the charging cable 230 is restrained. Incidentally, since the outside diameter of the cylindrical portion 204 is smaller than 30 times the diameter M of the charging cable 230, the side wall portion 201A is restrained from becoming excessively large, so that size increase of the charging cable-housing device 200 is restrained. Incidentally, in FIG. 5, the winding direction R of the charging cable 230 is a clockwise direction.

The second guide portion 340 and the second guide portion 341 are provided on a portion of the main surface of the side wall portion 201A which is located above the rotation center line O and the extraction opening 321.

The lead-out portion 343 is disposed on a portion of the main surface of the side wall portion 201A which is an outer peripheral edge portion of the side wall portion 201A and which is located above the second guide portions 340 and 341.

The first guide portion 342 is disposed on a portion of the main surface of the side wall portion 201A which is between the second guide portion 340 (341) and the lead-out portion 343 in the horizontal direction and which is above the second guide portions 340 and 341 and the lead-out portion 343.

Due to this arrangement, the portion of the charging cable 230 that is guided by the guide member 260 is restrained from having unfavorably small radius of curvature.

The second guide portion 341 is disposed nearer to the lead-out portion 343 than the second guide portion 340 is. The second guide portion 340 is disposed above the second guide portion 341 (i.e., higher than the second guide portion 341).

Due to this manner of guidance, the charging cable 230 is guided obliquely downward by the second guide portions 340 and 341. Concretely, the charging cable 230 is guided in such a direction that the charging cable 230 becomes gradually apart transversely from the lead-out portion 343 as the charging cable 230 extends downward. Thus, the portion of the charging cable 230 that is guided by the guide member 260 is restrained from having unfavorably small radius of curvature.

In FIG. 1, the vehicle 100 has a vehicle main body 101 in which the battery B is housed, and the vehicle main body 101 includes a side surface 106A and a side surface 106B that face in the width directions of the vehicle main body 101.

The side surfaces 106A and 106B are both provided with exterior component parts that include doors through which occupants get into and out of the vehicle 100, front fenders and rear fenders.

The vehicle 100 is also equipped with a tank 180 that stores gasoline as an energy source different from electric power, and a refueling portion 170 which is connected to the tank 180 and through which gasoline is supplied from outside. The gasoline supplied through the refueling portion 170 is kept in the tank 180. The tank 180 is disposed within the vehicle main body 101. In the example construction shown in FIG. 1, the tank 180 is disposed at a forward side of the battery B in the advance direction of the vehicle.

Although, in Embodiment 1, a hybrid vehicle that runs on gasoline and electric power is adopted as a typical example of the vehicle of the invention, the applications of the invention are not limited to the foregoing type of vehicle. For example, the invention is also applicable to a plug-in hybrid vehicle in which a fuel cell system is mounted. In this case, hydrogen or a liquid fuel that contains hydrogen atoms, such as ethanol, methanol, etc., is supplied through the refueling portion 170, and is kept in the tank 180. The refueling portion 170 is disposed in a rear fender 107 that is provided in the side surface 106A.

In FIG. 1 and FIG. 4, the winding direction R of the charging cable 230 is such a direction that the charging cable 230 extends along a portion of the bobbin 203 that faces the side surface 106A of the vehicle main body 101, a portion of the bobbin 203 that faces the upper surface of the vehicle main body 101, a portion of the bobbin 203 that faces the side surface 106B of the vehicle main body 101 and a portion of the bobbin 203 that faces the lower surface of the vehicle main body 101 in that order.

As shown in FIG. 4, the charging cable 230 is led out from an outer peripheral edge portion of the bobbin 203 that is relatively close to the side surface 106A, that is, a side surface 106A-side outer peripheral edge portion of the bobbin 203, and is led out of the extraction opening 321. Therefore, in FIG. 1, the plug 190 and the charging cable 230 can be easily pulled out toward the side surface 106B. That is, the plug 190 and the charging cable 230 can be easily pulled out in a direction away from the refueling portion 170.

Therefore, in the case where the external electric power source 206 is located at the side surface 106B side, the plug 190 can be easily connected to the external electric power source 206.

In FIG. 1, the vehicle main body 101 includes the back door 106C that is disposed in a rear portion of the vehicle. The back door 106C opens and closes a trunk compartment 330 that is formed inside the vehicle main body 101. The charging cable-housing device 200 is disposed on an outer surface of the back door 106C.

In FIG. 3, the bobbin 203 is formed so that the length of the bobbin 203 in the direction of the rotation center line O is shorter than the length thereof in the direction of the diameter of the side wall portions 201A and 201B. Since the bobbin 203 is disposed so that the rotation center line O extends in a horizontal direction along the longitudinal axis of the vehicle, the amount of protrusion of the bobbin 203 from the back door 106C is reduced.

The case 300 is fixed to an outside surface of the back door 106C. A recess portion 322 is formed in a bottom portion of the case 300. A lid 325 is provided for the recess portion 322.

Since the charging cable 230 is pulled out of the case 300, foreign matter, such as mud or the like, may sometimes attach to the charging cable 230.

The foreign matter attaching to the charging cable 230 may fall downward in the case 300. In this manner, foreign matter accumulates in the recess portion 322 that is formed in the bottom portion of the case 300. The foreign matter having accumulated in the recess portion 322 can be removed out of the case 300 by opening the lid 325.

The power supply harness 310 extends through a hole that is formed in the back door 106C, and is led out to an internal surface side of the back door 106C. In FIG. 1, the power supply harness 310 passes by a proximal portion of the back door 106C, and is connected to the battery B.

Figure 6:
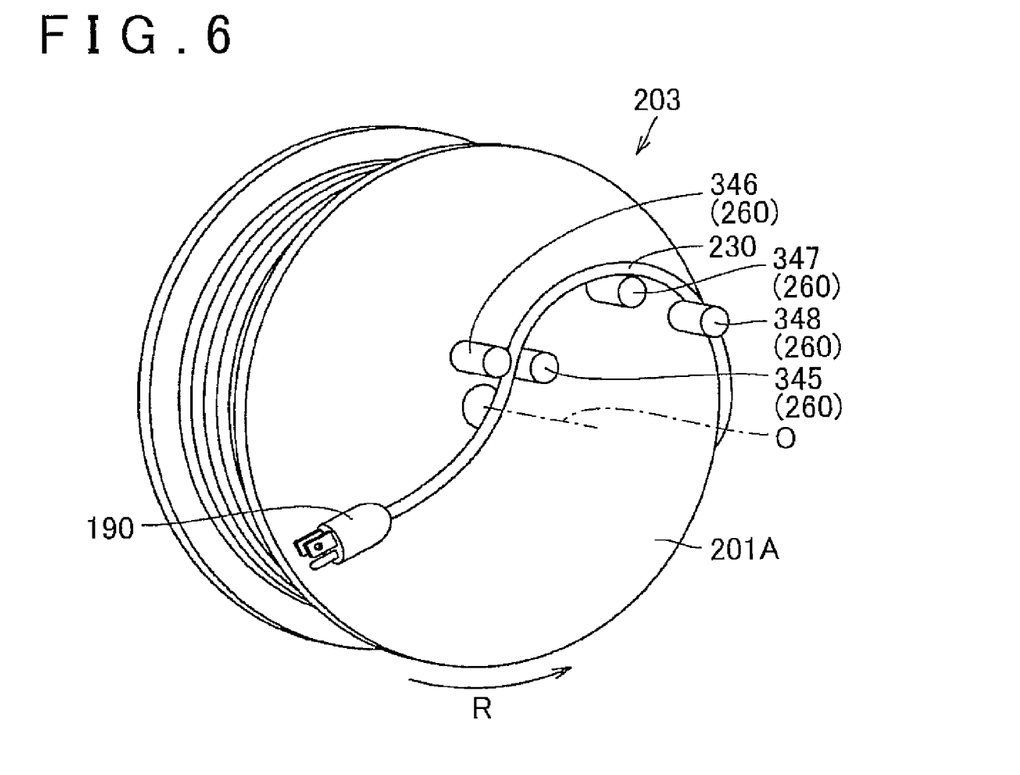
FIG. 6 is a perspective view of a modification of a charging cable mounted in the charging cable-housing device in accordance with Embodiment 1.
Figure 7:
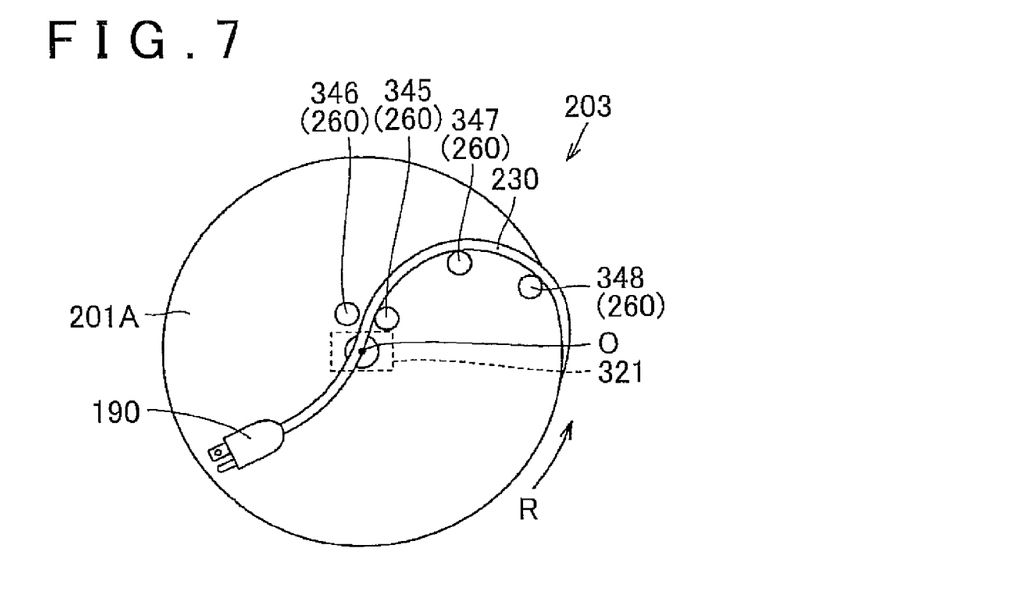
FIG. 7 is an elevation view of the bobbin and the side wall portion shown in FIG. 6.
Figure 8:
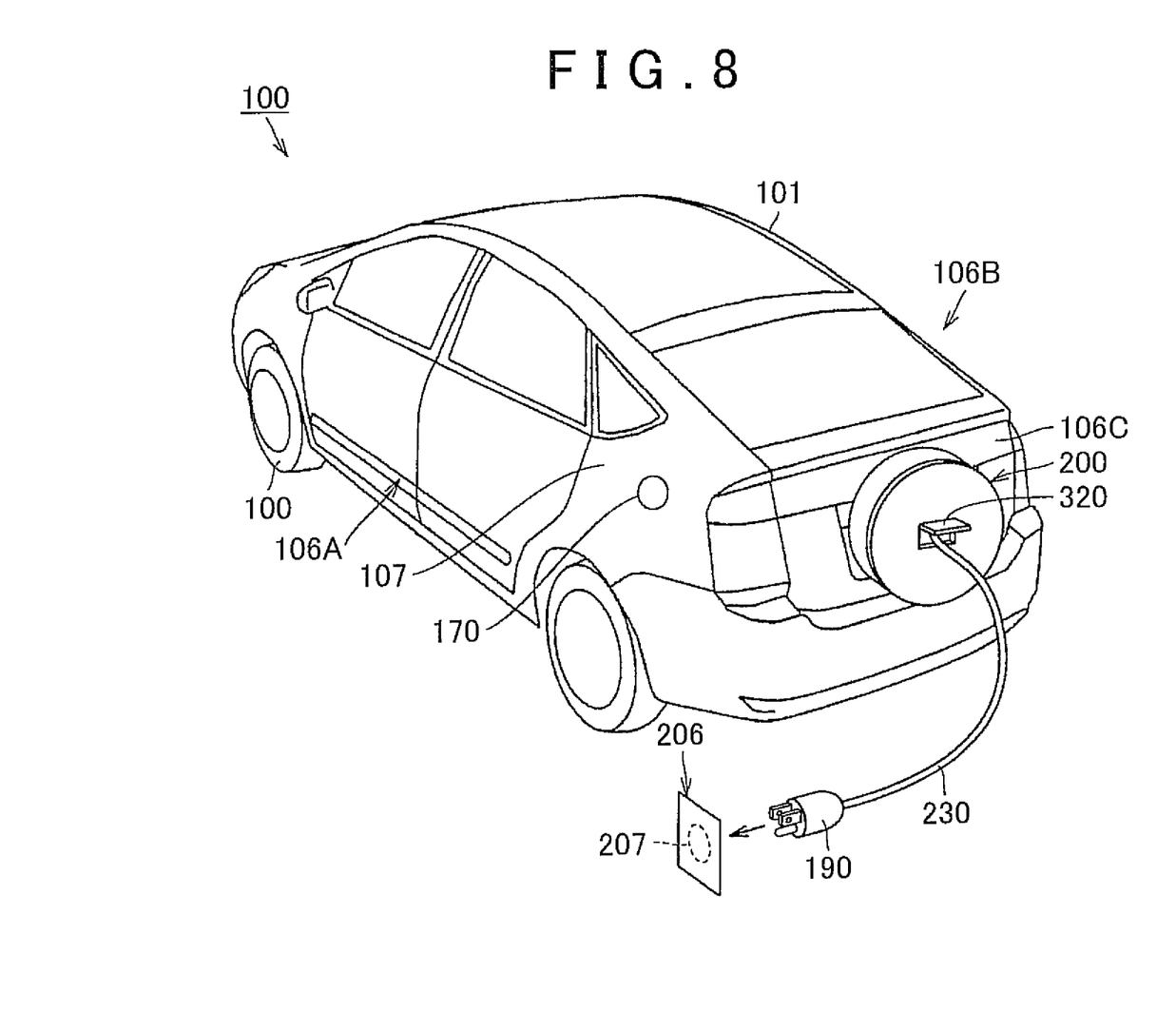
FIG. 8 is a perspective view of the vehicle that is equipped with the charging cable-housing device that has the bobbin and the side wall portion shown in FIGS. 6 and 7.

FIG. 6 is a perspective view of a modification of the charging cable 230 mounted in the charging cable-housing device 200 in accordance with Embodiment 1. FIG. 7 is a plan view of the bobbin 203 and the side wall portion 201A that are shown in FIG. 6. FIG. 8 is a perspective view of the vehicle 100 that is equipped with the charging cable-housing device 200 that has the bobbin 203 and the side wall portion 201A shown in FIGS. 6 and 7.

With regard to the bobbin 203 and the side wall portion 201A shown in FIG. 6 and FIG. 7, the winding direction R of the charging cable 230 is opposite the direction of the winding direction R of the bobbin 203 shown in FIG. 4 and FIG. 5.

Concretely, in FIGS. 8 and 7, the charging cable 230 is wound so that the charging cable 230 extends along a portion of the bobbin 203 that faces the side surface 106B of the vehicle main body 101, a portion if the bobbin 203 that faces the upper surface of the vehicle main body 101, a portion of the bobbin 203 that faces the side surface 106A and a portion of the bobbin 203 that faces the lower surface of the vehicle main body 101 in that order.

Then, the charging cable 230 wound on the bobbin 203 is led out from an outer peripheral edge portion of the side wall portion 201A which is close to the side surface 106B of the vehicle 100 toward the extraction opening 321 by the guide member 260.

The guide member 260 includes: a lead-out portion 348 that leads out the charging cable 230; a guide portion 347 that guides the charging cable 230 led out by the lead-out portion 348 to a location above extraction opening 321; and guide portions 345 and 346 that lead the charging cable 230 guided by the guide portion 347 downward and guides it toward the extraction opening 321.

Thus, the charging cable 230 that is wound on the bobbin 203 and is guided by the guide member 260 as described above can be easily pulled out to the side surface 106A side of the vehicle 100 as shown in FIG. 8.

Therefore, the plug 190 can be easily connected to an external electric power source 206 in the case where the external electric power source 206 is disposed at the side surface 106A side.

Incidentally, in the vehicle 100 in accordance with Embodiment 1, the charging cable-housing device 200 is disposed in a rear portion of the vehicle main body 101 which is at the center of the vehicle main body 101 in its width direction. Therefore, there is substantially no difference in the pulled-out length of the charging cable 230 whether the plug 190 is pulled out in the direction to the side surface 106A side or to the side surface 106B side. That is, the charging cable 230 can be easily pulled out in either direction.

Incidentally, as shown in FIG. 3, a plug holder portion 323 having a recess space shape is formed in the case 300. During an ordinary state when charging is not performed, the plug 190 is disposed within the plug holder portion 323.

A vehicle 100 and a charging cable-housing device 200 in accordance with Embodiment 2 of the invention will be described with reference to FIGS. 9 and 10. The constructions shown in FIGS. 9 and 10 that are substantially the same as or correspond to those described above are denoted by the same reference characters, and descriptions thereof are omitted below.

Figure 9:
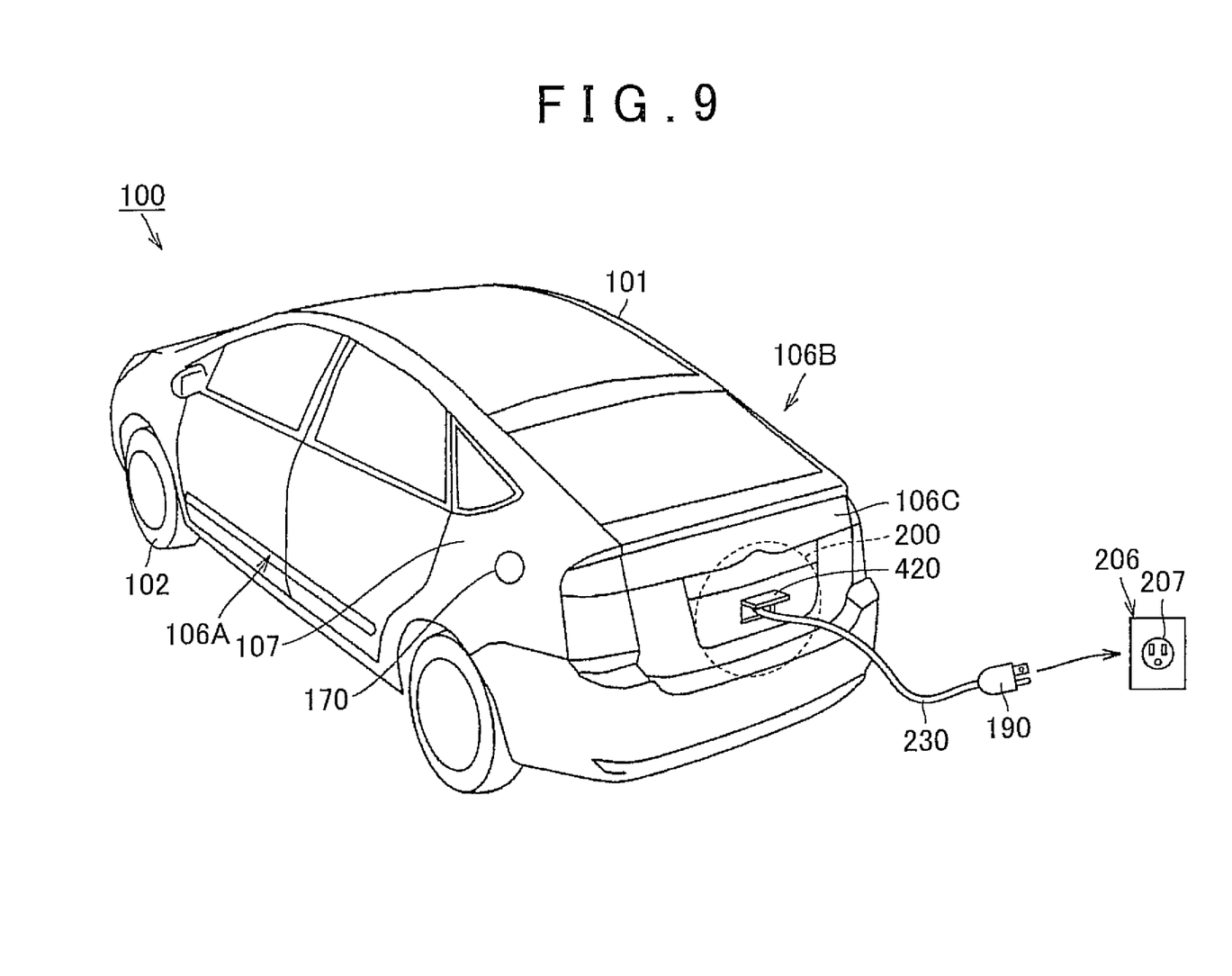
FIG. 9 is a perspective view of a vehicle in accordance with Embodiment 2.
Figure 10:
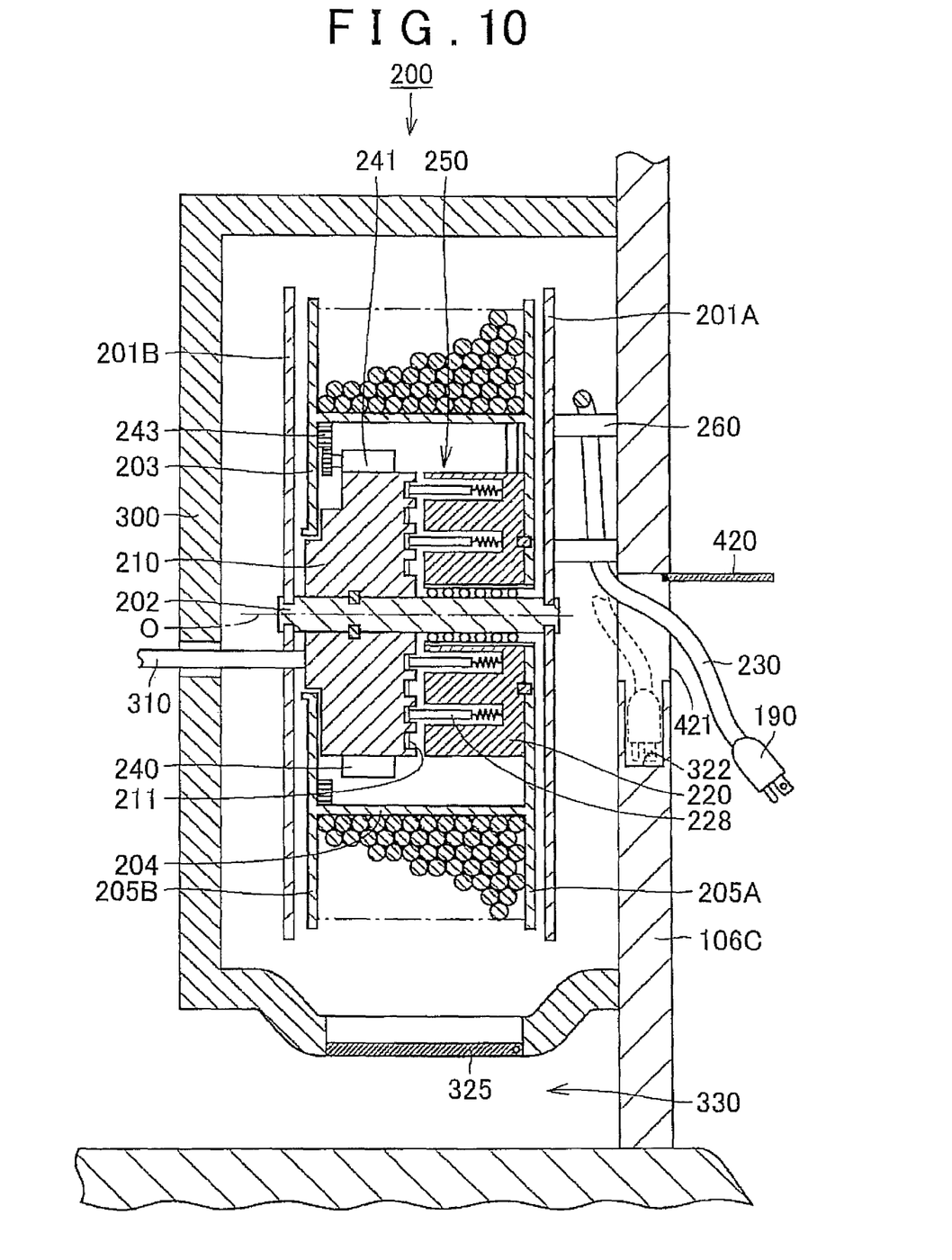
FIG. 10 is a sectional view of a charging cable-housing device in accordance with Embodiment 2.

FIG. 9 is a perspective view of a vehicle 100 in accordance with Embodiment 2, and FIG. 10 is a sectional view of a charging cable-housing device 200 in accordance with Embodiment 2.

As shown in FIGS. 9 and 10, the charging cable-housing device 200 is disposed within a trunk compartment 330.

The charging cable-housing device 200 is fixed to an inner surface of a back door 106C. The back door 106C has an extraction opening 421, and is provided with a lid 420 that opens and closes the extraction opening 421.

Incidentally, in the charging cable-housing device 200 in accordance with Embodiment 2, a casing that houses a bobbin 203 and the like is formed by the back door 106C and a case 300 that is disposed at the inner surface side of the back door 106C. The extraction opening 421 is formed at a position in the back door 106C which is on the rotation center line O of the bobbin 203. Therefore, the extraction opening 421 is also formed so that the opening faces in the rearward direction of the vehicle 100.

By disposing the charging cable-housing device 200 within the trunk compartment 330 in the foregoing manner, it is possible to restrain the charging cable-housing device 200 from protruding outward.

It is to be understood that the foregoing embodiments are merely illustrative and not restrictive in any respect. The scope of the invention is shown not by the foregoing descriptions but by the appended claims for patent, and is intended to cover all modifications within the meaning and scope equivalent to those shown by the claims for patent.

What is claimed is:

1. A charging cable-housing device comprising:
   a charging cable that supplies electric power from an external electric power source to a vehicle;
   a rotatable bobbin on which the charging cable is wound, the bobbin is disposed in a rear portion of the vehicle;
   a shaft portion that rotatably supports the bobbin;
   a casing that houses the bobbin, the casing has an extraction opening through which the charging cable is extracted out, the extraction opening is provided at a position on a rotation center line of the bobbin;
   a side wall portion that is fixed to the shaft portion. the side wall portion is disposed nearer to the extraction opening than the bobbin; and
   a guide member having a lead-out portion and a guide portion, the lead-out portion leads out the charging cable wound around the bobbin, the guide portion includes a first guide portion and a second guide portion. the first guide portion guides the charging cable led out by the lead-out portion to a location that is above the extraction opening, the second guide portion guides the charging cable guided by the first guide portion to the extraction opening.

2. The charging cable-housing device according to claim 1, wherein
   the bobbin includes a cylindrical portion on whose outer peripheral surface the charging cable is wound, and an outside diameter of the cylindrical portion is greater than or equal to 15 times and less than or equal to 30 times as large as a diameter of the charging cable.

3. The charging cable-housing device according to claim 1, further comprising a motor that rotates the bobbin, wherein:
   the bobbin includes a cylindrical portion on whose outer peripheral surface the charging cable is wound; and
   the motor is disposed in the cylindrical portion.

4. The charging cable-housing device according to claim 1, wherein
   the bobbin is disposed so that the rotation center line of the bobbin extends in a horizontal direction and the extraction opening faces in a rearward direction of the vehicle.

5. The charging cable-housing device according to claim 1, wherein
the lead-out portion and the guide portion are provided on a main surface of the side wall portion that faces the extraction opening.

6. The charging cable-housing device according to claim 1, wherein:
the lead-out portion, the first guide portion and the second guide portion are provided on a main surface of the side wall portion that faces the extraction opening;
the second guide portion is disposed above the extraction opening;
the lead-out portion is disposed in an outer peripheral edge portion of the side wall portion that is above the second guide portion; and
the first guide portion is disposed at a location that is between the second guide portion and the lead-out portion in a horizontal direction and that is above the second guide portion.

7. The charging cable-housing device according to claim 1, wherein the lead-out portion, the first guide portion and the second guide portion are formed as pins that protrude outwardly from a main surface of the side wall portion, the main surface of the side wall portion faces the extraction opening.

8. A vehicle comprising:
an electricity storage that is rechargeable;
a reservoir portion in which energy is kept in a form that is different from electric power;
a vehicle main body that houses the electricity storage and the reservoir portion, and that includes a first side surface and a second side surface that is located at a side opposite the first side surface; and
a charging cable-housing device that is provided in a rear portion of the vehicle main body, and that is connected to the electricity storage, wherein the charging cable-housing device includes:
a charging cable that supplies electric power from an external electric power source to the electricity storage;
a rotatable bobbin on which the charging cable is wound, the bobbin is disposed in a rear portion of the vehicle main body;
a shaft portion that rotatably supports the bobbin;
a casing that houses the bobbin, the casing has an extraction opening through which the charging cable is extracted out, the extraction opening is provided at a position on a rotation center line of the bobbin;
a side wall portion that is fixed to the shaft portion, the side wall portion is disposed nearer to the extraction opening than the bobbin; and
a guide member having a lead-out portion and a guide portion, the lead-out portion leads out the charging cable wound around the bobbin, the guide portion includes a first guide portion and a second guide portion. the first guide portion guides the charging cable led out by the lead-out portion to a location that is above the extraction opening, the second guide portion guides the charging cable guided by the first guide portion to the extraction opening.

9. The vehicle according to claim 8, further comprising a supply portion that is provided on the first side surface of the vehicle main body, and that supplies energy supplied from outside to the reservoir portion in a form that is different from electric power, wherein
the charging cable is wound around the bobbin so that the charging cable extends along a portion of the bobbin that faces the first side surface of the vehicle main body, a portion of the bobbin that faces an upper surface of the vehicle main body, a portion of the bobbin that faces the second side surface of the vehicle main body, and a portion of the bobbin that faces a lower surface of the vehicle main body in that order.

10. The vehicle according to claim 8, further comprising a supply portion that is provided on the first side surface of the vehicle main body, and that supplies energy supplied from outside to the reservoir portion in a form that is different from electric power, wherein
the charging cable is wound around the bobbin so that the charging cable extends along a portion of the bobbin that faces the second side surface of the vehicle main body, a portion of the bobbin that faces an upper surface of the vehicle main body, a portion of the bobbin that faces the first side surface of the vehicle main body, and a portion of the bobbin that faces a lower surface of the vehicle main body in that order.

11. The vehicle according to claim 8, wherein the lead-out portion, the first guide portion and the second guide portion are formed as pins that protrude outwardly from a main surface of the side wall portion, the main surface of the side wall portion faces the extraction opening.

* * * * *